United States Patent [19]

Tarr

[11] 4,159,836

[45] Jul. 3, 1979

[54] BOOK HOLDER AND READING LOCATOR

[76] Inventor: Hazel Tarr, 819 Paseo Grande, Corona, Calif. 91720

[21] Appl. No.: 866,535

[22] Filed: Jan. 3, 1978

[51] Int. Cl.[2] ........................ B42D 17/00; G02B 27/02

[52] U.S. Cl. ........................................ 281/45; 40/352; 248/441 A; 350/239

[58] Field of Search .................. 281/45; 350/239, 241, 350/247; 248/441 R, 441 A, 451, 455, 463; 40/341, 352, 361

[56] References Cited

U.S. PATENT DOCUMENTS

| | | | |
|---|---|---|---|
| 2,244,773 | 6/1941 | Hawk | 248/451 |
| 2,604,009 | 7/1952 | Walrath | 350/241 |

*Primary Examiner*—Travis S. McGehee

[57] ABSTRACT

An apparatus with a holder body forming a flat surface with an angular support member to hold a printed publication at a convenient angle. The publication maintains intimate contact with the body being superimposed with a transparent fixably attached retaining plate. The retaining plate being vertically adjustable and removable with hairlines inscribed into the parent material extending horizontally and vertically. An opaque locator body is slideably attached to the retainer plate with an overlapping hem being horizontally movable with a rectangular window positioned in the center. The window displays the transparent retaining plate with the exposed hairline and the positioned indica. The holder body is supported on the back with a single leg at an oblique angle to the base and diagonally to the body being rotatable and folding against the back of the holder.

2 Claims, 4 Drawing Figures

BOOK HOLDER AND READING LOCATOR

BACKGROUND OF THE INVENTION

1. Field of the Invention

This invention relates to mechanical supports of easel type for retaining printed publication including a transparent viewing portion.

2. Description of the Prior Art

Previously mechanical devices for holding printed matter have been limited to floor stands or easels for support with other means being utilized to hold books open such as clips, clamps, slides and the like such as taught in the U.S. Pat. No. 2,957,390 by F. W. BAUKUS, for a BOOK LINER AND MAGNIFIER, dated Oct. 25, 1960. Also, U.S. Pat. No. 2,527,071, by G. J. PIERCE, for a MAGNIFYING ATTACHMENT FOR BOOKS, dated Oct. 24, 1950 and U.S. Pat. No. 2,057,807, by E. WHITMORE, for a MAGNIFYING DEVICE, dated Oct. 20, 1936. Optical devices have been in use for some time, however, with singular purpose to magnify the printing so as to optically increase the size of the printed characters such as taught in U.S. Pat. No. 2,166,988 by R. E. FOSDICK, for a COMPOUND READING LENS, dated July 25, 1939.

SUMMARY OF THE INVENTION

The present invention provides a reader with an apparatus to hold printed matter in place with a rigid body at a convenient angle.

The rigid body containing a supporting leg and provisions for an adjustable transparent retaining plate with position locating hairlines. A locator body with a transparent window is attached to the retaining plate being also adjustable.

The need for a complete apparatus containing features to not only hold printed matter but maintain the axact reading location and provide magnifying of the indica has long been felt.

OBJECTS AND ADVANTAGES OF THE INVENTION

With the foregoing is mind it becomes the primary object of the invention to provide a means to hold a publication and while reading follow the text and when glancing away easily returning to the same point.

This advantage is particularly realized when using detailed printed matter mainly complex instruction dialog as utilized in handwork, knitting, crocheting, tatting, etc. were frequent leaving and returning to the subject matter is encountered.

An important object of the invention is the positioning of a window with hairlines in movable fashion allowing the entire printed page to visually transversed both vertically and horizontally.

A more specific object provides a retainer to hold the printed matter in an open position as in a book or flat with the leaves folded over as a magazine or brochure. The retainer being transparent, not only provides a method of flatening and holding the pages but allows the entire page to be seen easily and to position the window in the focus area.

A still further object allows the printed publication to be supported on the bottom member with gravity holding it in place with the body tilted at an angle convenient to be observed at the desired distance from the reader with the angle being adjustable.

Another object of the invention provides adaptation to most common size books and magazines with adjustments allowing a varying thickness of the printed material.

Yet another object provides an apparatus that is inexpensive, easily manufactured of simple construction and lends its function and adjustment to be easily understood.

These and other objects and advantages of the present invention will become apparent from the subsequent detailed description of the preferred embodiment and the appended claims taken in conjunction with the accompanying drawings.

DESCRIPTION OF THE PREFERRED EMBODIMENT

Figure 1:
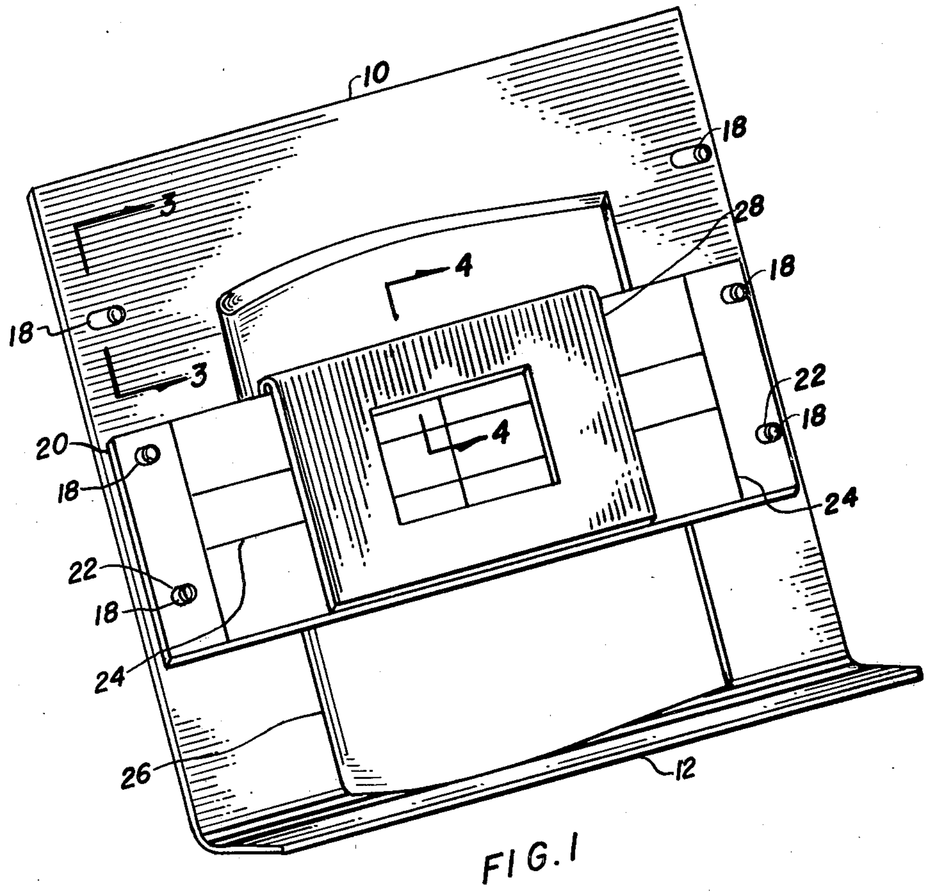
FIG. 1 is a partial isometric view of the preferred embodiment with printed publication in place and the support leg extended.
Figure 2:
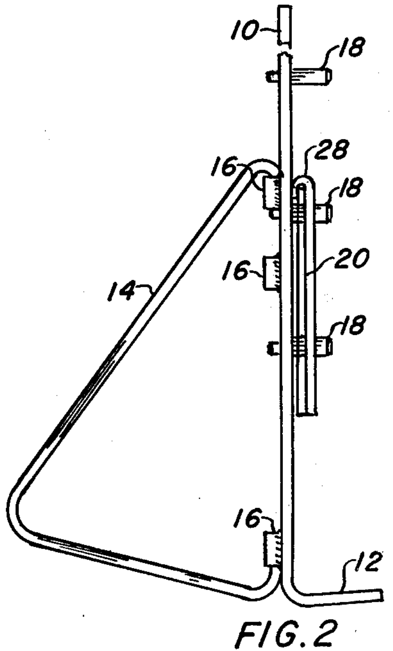
FIG. 2 is an end view cut in the vertical plane for clarity with the printed matter deleted.
Figure 3:
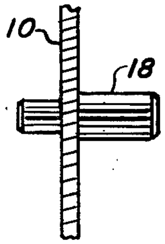
FIG. 3 is a sectional view taken through one of the attaching pins.
Figure 4:
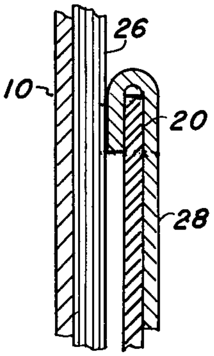
FIG. 4 is a sectional view taken through the body retaining plate and locator body with the printed publication in place.

Referring now more particularly to the referenced characters of the drawing, the invention utilizes a holder body 10 of metallic or non-metallic material being opaque, transparent or translucent of sufficient structural integrity and regidity to support weight and apply fastening means and appertences. The body is rectangular in shape and slightly larger than most conventional printed publications. The body is formed with a support angle base 12, at right angles to the body forming a shelf to support the weight of the printed matter 26 when placed thereon. The support angled base being integral with the body or attached with fastening means.

The support leg 14 being comprised of a singular round metallic structure formed into a triangular shape with the bottom at oblique angles to the holder body and the vertical leg being diagonal to the body. Each end formed at opposed angles facing each other allowing fastening means 16 to grasp the ends holding the leg rigid still allowing the leg to rotate 90° on either side thereby collapsing flat against the body. A plurality of fastening means hold the leg in relative tension allowing the leg to be positioned at the desired angle.

That plurality of fastening means are located on the back in the center of the body and allow the leg to be extended or contracted changing the angle of recline of the apparatus as desired.

Although the round structure is the preferred embodiment a leg of the same material as the body may be utilized either fixed permanently, removable or rotatable to fit flat against the body.

A plurality of attaching pins 18 preferrably of a metallic composition are inserted into the holder body 10 and held in place with fastening means or by close tolerance fit. The pins 18 are round in shape and of a length to accommodate both the printed matter 26 and a superimposed retaining plate 20.

This retainer plate 20 consists of optically clear material in a rectangular configuration, the approximate width of the holder body and of a height comparable with the attached publication. Along the vertical edge a plurality of bores 22 of equal space provide attachment to the pins 19 and as such allow for varying distance between the plate 20 and the body 10 to compensate for the difference in publication thickness. The position of the holes 22 and the pins 18 allow a vertical adjustment to be made as the reader progresses in the printed text. The transparent substance of the retainer plate allows visual indication of the indica underneath enhancing the readers ability to ascertain his exact location in relation to the beginning and end of the text. Hairlines 24 inbedded in the surface in both vertical and horizontal directions still further indicate the readers exact position especially in small printed complex instructions or directions. The hairlines may be also made by scribing and filling with pigmented substance or the like.

A locator body 28, of opaque material substantially flat, rectangular in shape with the top edge formed at re-entering angles much like a hem with a radius equal to or larger than the thickness of the retainer plate 20. The locator 28 being attached or positioned on the retainer plate 20 embracing the plate at the intersection of the intersection of the locator and the top of the retainer. The locator therefore being slidably affixed allowing freedom of lateral movement limited only by the pins 18. In the center of the locator 28 a rectangular opening or window allows the publication 26 to be viewed through the transparent retainer 20 also in full view are the hairlines 24.

In operation the printed publication is placed on the body 10 with a retainer plate 20 affixed thereto through the locating pins 18 and the locator body 28 supported slidable on the plate. While the preferred embodiment has been described in complete detail and shown in the accompanying drawings it is not to be limited to this configuration since other details would be equally adaptable such as the support angle base hinged to fold flat against the holder body, variable distance between the hairlines and an optically magnifying glass or fresnel lens in the window of the locator. It will also be understood that many modifications and changes may be in the invention without departing from the spirit and scope thereof. Hence it is described to cover any and all modifications and forms which may come within the language and scope of the appended claims.

I claim:

1. A device for supporting printed publications with a transparent viewing position comprising:

a substantially flat holder body member with an angular base integral with said body or attached thereto having a support leg on the opposed side fixable attached with a plurality of connecting means changing the angle of recline of said leg, also being rotatable from parallel to wide angles to said body and a plurality of rigid equally spaced attaching pins located vertically near the edge of said body to which a retainer plate of optically clear material rectangular in shape with a plurality of bores is slidable affixed to said pins allowing retension of printed matter reclining upon said body, the retainer including a plurality of integral hairlines located vertically and horizontally on or about the surface and a locator member of opaque material slidable attached to said retainer with a longitudinal juncture adapated to cooperate with the upper surface of said retainer including a rectangular opening removed from the material forming a window to view the exposed indica.

2. A device as recited in claim 1 wherein said retainer contains in the window a condensing lens in thin transparent form containing a plurality of prisms with varying angular displacement spiraly located about the center juxtaposed with the exposed indica.

* * * * *